Patented Nov. 24, 1953 — 2,660,093

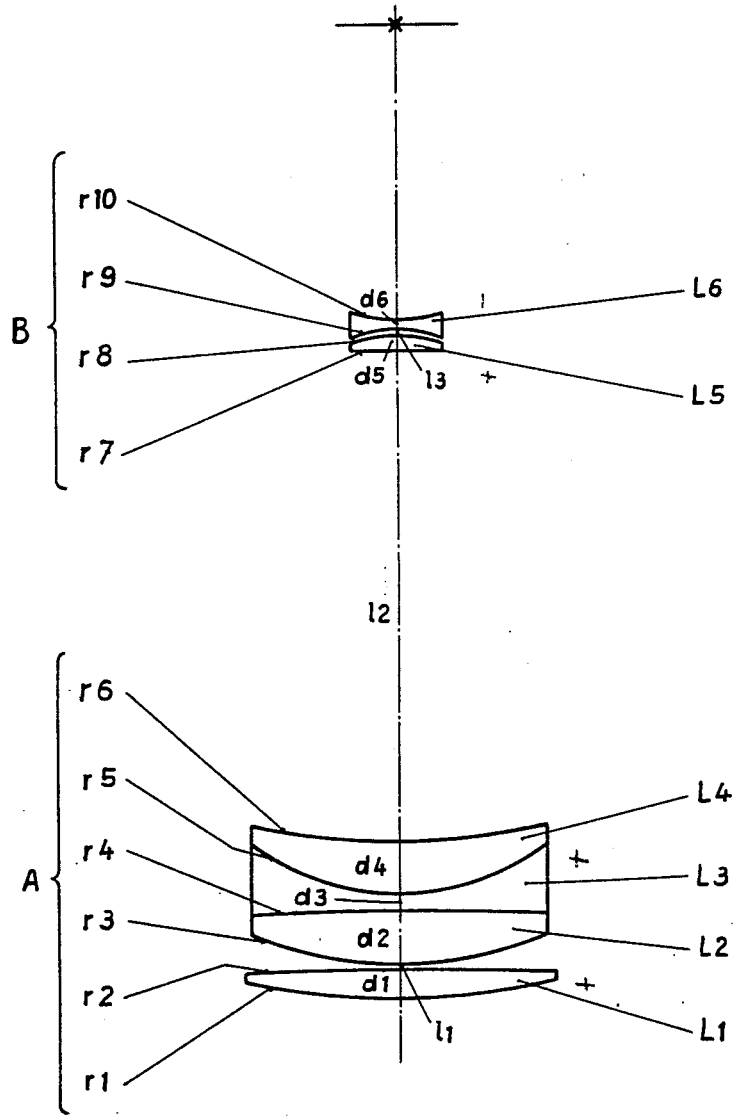

UNITED STATES PATENT OFFICE 2,660,093

TELESCOPE OBJECTIVE

Ludwig Bertele, Heerbrugg, Switzerland, assignor to Henry Wild Surveying Instruments Supply Co. Ltd., Heerbrugg, Switzerland, a Swiss company Application September 6, 1950, Serial No. 183,329

1 Claim. (Cl. 88—57)

The present invention relates to a telescope objective composed of a positive system assembly A and a negative system assembly B slidably arranged to permit of focusing. The positive system assembly A consists of two positive members separated from each other by an air space, of which members that directed towards the object is preferably a simple lens and that directed towards the image a cemented triple lens. The negative system assembly B consists of one positive and one negative lens separated from each other in accordance with the invention by an air space greater than 0.01% and less than 3% of the total focal length of the objective. The two lenses are so arranged that the negative lens is directed towards the plane of the image. In the air space between the aforementioned positive and negative lenses of the negative system assembly B, the bundle of parallel rays incident to the positive system assembly A is propagated with the greatest convergence throughout its entire course. Investigations have shown that a powerfully convergent course of the rays in the negative assembly B of the system is completely sufficient to accomplish spherically zone-free and also spherochromatic correction. For the purpose of enhancing the possibilities of correction, further cemented surfaces can be inserted in the individual members.

In view of the possibility of giving the lens surfaces low reflection characteristics by coating them, cementing of the separate lenses can be dispensed with, so that thin layers of air are left between these lenses. The limiting surfaces defining these air-lenses may exhibit slight differences of radius.

The example and figure illustrate such a telescope objective with a focal length of $f=100$ mm. with an aperture ratio of 1 : 5.1. The positive assembly of the system consists of a simple lens $L_1$ and the cemented triple lens ($L_2$—$L_3$—$L_4$). The negative assembly of the system consists of the lenses $L_5$ and $L_6$. The air space between these two lenses is 0.4% of the total focal length.

The radii are designated by $r$, the thicknesses by $d$, the air spaces by $l$, the refractive index for the $d$-line of the spectrum by $n$, and the Abbé index by $V$.

Example

[Aperture ratio 1 : 5.1.]

|  | Radii | Thicknesses and Clearances | Types of glass | |
|---|---|---|---|---|
|  |  |  | $n_d$ | V |
| $L_1$ | $r_1=+44.07$ | $d_1=2.00$ | 1.55178 | 63.5 |
|  | $r_2=-265.66$ | $l_1=0.10$ |  |  |
| $L_2$ | $r_3=+21.09$ | $d_2=3.70$ | 1.48826 | 69.9 |
|  | $r_4=-203.11$ |  |  |  |
| $L_3$ |  | $d_3=1.20$ | 1.61399 | 44.0 |
|  | $r_5=+15.83$ |  |  |  |
| $L_4$ | $r_6=+45.95$ | $d_4=3.40$ | 1.48826 | 69.9 |
|  |  | $l_2=32.10$ |  |  |
|  | $r_7=\infty$ |  |  |  |
| $L_5$ |  | $d_5=1.00$ | 1.74344 | 26.4 |
|  | $r_8=-8.60$ | $l_3=0.40$ |  |  |
|  | $r_9=-7.35$ |  |  |  |
| $L_6$ |  | $d_6=0.70$ | 1.66497 | 36.0 |
|  | $r_{10}=+14.07$ |  |  |  |

What is claimed is:

A telescope objective, comprising a positive system assembly and a negative system assembly, the positive system assembly consisting of two positive members with at least two cemented surfaces, said two positive members being separated in space, the negative system assembly comprising a negative member and a positive member spaced from the said negative member, said negative member being located closer to the picture plane than the last-mentioned positive member, the air gap between said negative member and the last-mentioned positive member having the form of a meniscal condensing lens bent toward said picture plane, the thickness of said air gap being greater than 0.0001 f and smaller than 0.03 f, the focal length of the last-mentioned positive member being greater than 0.05 f and less than 0.4 f, whereby f is the total focal length of the objective.

LUDWIG BERTELE.

References Cited in the file of this patent

UNITED STATES PATENTS

| Number | Name | Date |
|---|---|---|
| 1,791,276 | Konig | Feb. 3, 1931 |
| 2,158,201 | Schade | May 16, 1939 |
| 2,321,973 | Bennett | June 15, 1943 |
| 2,458,836 | Cox | Jan. 11, 1949 |

FOREIGN PATENTS

| Number | Country | Date |
|---|---|---|
| 222,709 | Great Britain | Oct. 9, 1924 |